United States Patent
Kim et al.

(10) Patent No.: US 9,561,591 B2
(45) Date of Patent: Feb. 7, 2017

(54) ROBOT MOTION DATA PROCESSING SYSTEM USING MOTION DATA REDUCTION/RESTORATION COMPATIBLE TO HARDWARE LIMITS

(71) Applicant: KOREA INSTITUTE OF SCIENCE AND TECHNOLOGY, Seoul (KR)

(72) Inventors: Doik Kim, Seoul (KR); Jung Min Park, Seoul (KR); Sungon Lee, Seoul (KR); Jaeyoung Park, Seoul (KR); Seokmin Hong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 15 days.

(21) Appl. No.: 14/581,433

(22) Filed: Dec. 23, 2014

(65) Prior Publication Data

US 2016/0052132 A1 Feb. 25, 2016

(30) Foreign Application Priority Data

Aug. 20, 2014 (KR) .................. 10-2014-0108497

(51) Int. Cl.
*B25J 9/16* (2006.01)
*B25J 9/00* (2006.01)

(52) U.S. Cl.
CPC ............. *B25J 9/1664* (2013.01); *B25J 9/0081* (2013.01); *B25J 9/163* (2013.01); *B25J 9/1689* (2013.01);
(Continued)

(58) Field of Classification Search
CPC ............ G05B 2219/40391; G05B 19/4086; G05B 2219/36442; G05B 19/416; G05B 2219/43042; G05B 2219/40512; G05B 2219/40435; B25J 9/1656; B25J 9/1664; B25J 9/163; B25J 9/1689; B25J 9/0081; Y10S 901/03; Y10S 901/47

See application file for complete search history.

(56) References Cited

U.S. PATENT DOCUMENTS 5,046,022 A    9/1991  Conway et al.
5,159,250 A *  10/1992 Jeon ................ G05B 19/416
                                              318/561

(Continued)

FOREIGN PATENT DOCUMENTS

KR    1994-0002206 B1   3/1994
KR    10-1390819 B1     5/2014

OTHER PUBLICATIONS

Hirche, Sandra, et al. "Transparent Data Rreduction in Networked Telepresence and Teleaction Systems. Part I: Communication without Time Delay." Presence: Teleoperators and Virtual Environments vol. 16, No. 5, Oct. 2007, pp. 523-531.

(Continued)

*Primary Examiner* — Jason Holloway
(74) *Attorney, Agent, or Firm* — NSIP Law

(57) ABSTRACT

A robot motion data processing system has a data extraction module for intermittently extracting restoration motion data from a successive input motion trajectory formed for controlling a motion of a robot, and a data restoration module for restoring an output motion trajectory approximate to the input motion trajectory by using restoration motion data extracted from the data extraction module. The output motion trajectory is restored to satisfy a condition that the robot operating according to the output motion trajectory does not exceed a hardware operation limit of the robot.

13 Claims, 9 Drawing Sheets

(52) U.S. Cl.
CPC ........... *G05B 2219/40435* (2013.01); *G05B 2219/40512* (2013.01); *Y10S 901/03* (2013.01)

(56) References Cited

U.S. PATENT DOCUMENTS

| | | | | |
|---|---|---|---|---|
| 8,194,971 | B2* | 6/2012 | Kim | G06K 9/00348 |
| | | | | 382/103 |
| 8,965,574 | B2* | 2/2015 | Joly | B25J 9/161 |
| | | | | 422/73 |
| 9,114,530 | B2* | 8/2015 | Tsusaka | B25J 9/1656 |
| 2010/0135572 | A1* | 6/2010 | Kim | G06K 9/00348 |
| | | | | 382/153 |
| 2010/0217442 | A1 | 8/2010 | Lee | |
| 2013/0236050 | A1 | 9/2013 | Choi et al. | |
| 2013/0310977 | A1* | 11/2013 | Tsusaka | B25J 9/1656 |
| | | | | 700/257 |
| 2015/0290795 | A1* | 10/2015 | Oleynik | G05B 19/42 |
| | | | | 700/257 |
| 2016/0059412 | A1* | 3/2016 | Oleynik | B25J 9/163 |
| | | | | 700/257 |

OTHER PUBLICATIONS

Extended European Search Report issued on Aug. 12, 2016 in counterpart European Application No. 15150597.1.(13 pages in English).

* cited by examiner

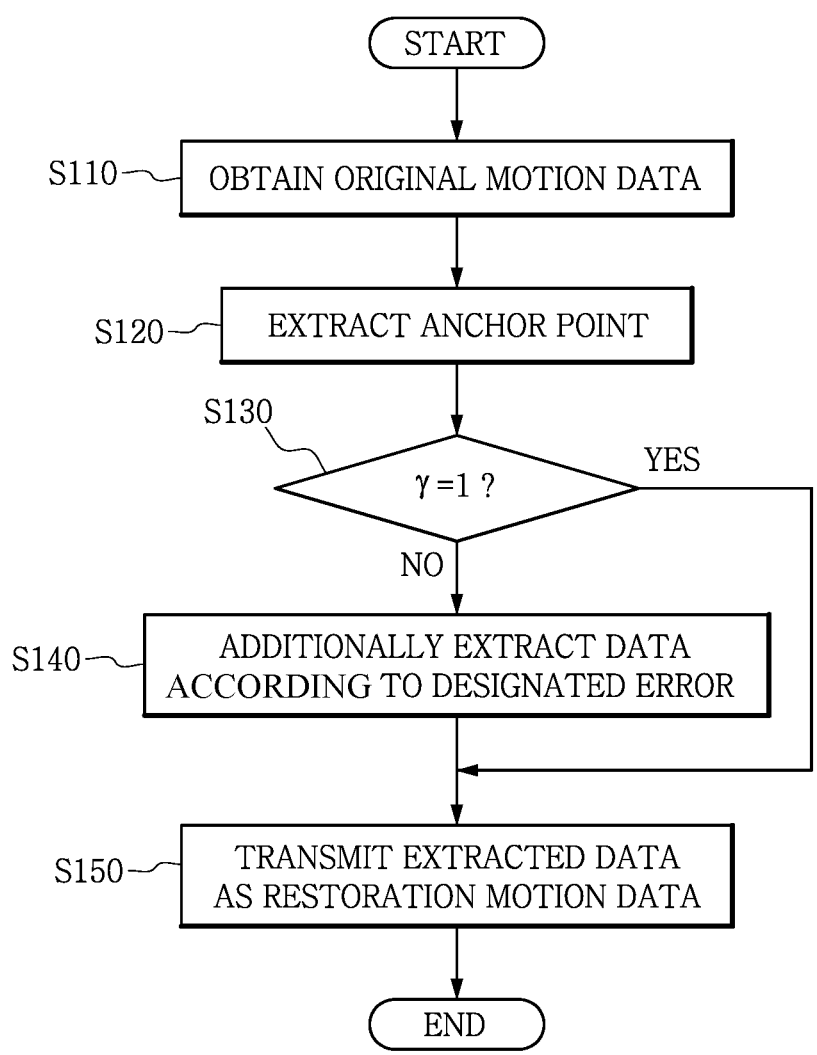

ROBOT MOTION DATA PROCESSING SYSTEM USING MOTION DATA REDUCTION/RESTORATION COMPATIBLE TO HARDWARE LIMITS

CROSS-REFERENCE TO RELATED APPLICATION

This application claims priority to Korean Patent Application No. 10-2014-0108497, filed on Aug. 20, 2014, and all the benefits accruing therefrom under 35 U.S.C. §119, the contents of which in its entirety are herein incorporated by reference.

BACKGROUND

1. Field

The present disclosure relates to a robot motion data processing system, and more particularly, to a robot motion data processing system for processing motion data, generated for operating a robot, in consideration of hardware limits.

2. Description of the Related Art

As robots are used in more fields, a "smart robot" is being developed to perform highly-developed operations in more diverse environments, without being limited to an industrial robot having a simple workspace and simple operation patterns.

The smart robot is, for example, a robot (slave) which imitates a motion of a human (master) as it is.

A motion of a human is performed continuously along a trajectory and thus may be expressed as a successive motion trajectory.

In order to allow the slave to imitate a motion of the master most similarly, data about the successive motion trajectory of the master should be split as small as possible and then transmitted to the slave over as numerous times as possible. It is known that data should be transmitted at least 100 times per second in order to obtain real-time synchronization between a source and a target.

In other words, in case of robot motion data for controlling a robot, an amount of information included therein is small but transmission frequency should be high, different from general sound/image data.

For real-time robot control, it is a main technical issue how frequently data can be transmitted per unit time.

This may be satisfied to some extent if a rapid network with excellent performance is constructed. However, there is a limit in aspect of communication technology and hardware in enhancing a transmission velocity of a network.

For this reason, a study for compressing data to reduce an amount or transmission frequency of the robot motion data is being made to realize real-time control.

However, a data restoring method compatible for characteristics of a target, which is a robot operating according to a successive trajectory, has not been proposed so much.

SUMMARY

The present disclosure is directed to providing a motion data processing system compatible for a control target, namely a robot.

In one aspect, there is provided a robot motion data processing system, which includes: a data extraction module for intermittently extracting restoration motion data from a successive input motion trajectory formed for controlling a motion of a robot; and a data restoration module for restoring an output motion trajectory approximate to the input motion trajectory by using restoration motion data extracted from the data extraction module. The output motion trajectory is restored to satisfy a condition that the robot operating according to the output motion trajectory does not exceed a hardware operation limit of the robot.

According to an embodiment, the data restoration module may be configured to: generate an estimated trajectory estimated based on a received first restoration motion data; and when a second restoration motion data is received in succession to the first restoration motion data, generate a tracking trajectory, which tracks the second restoration motion data, based on the second restoration motion data and a current robot motion data indicated by an end point of the estimated trajectory, thereby generating the output motion trajectory connecting from the estimated trajectory to the tracking trajectory in real time.

According to an embodiment, the tracking trajectory may be generated to track estimated motion data, which estimates a motion of the robot after a predetermined time from a point when the second restoration motion data is received, based on the second restoration motion data.

According to an embodiment, when it is determined that the robot does not trace the estimated motion data even though the robot is operated up to a maximum operation limit, the tracking trajectory may be generated to trace the second restoration motion data with a predetermined time delay within the maximum operation limit of the robot.

According to an embodiment, the tracking trajectory may be generated by performing convolution at least once to a restoration function having a distance between a position of the robot indicated by the end point of the estimated trajectory and a position of the robot indicated by the second restoration motion data as an area with a rectangular wave function having an area of 1.

According to an embodiment, the tracking trajectory may be generated by performing convolution at least once to a restoration function having a distance between a position of the robot indicated by the end point of the estimated trajectory and a position of the robot indicated by the estimated motion data as an area with a rectangular wave function having an area of 1.

According to an embodiment, after receiving a first restoration motion data and also receiving a second restoration motion data in succession to the first restoration motion data, the data restoration module may generate a tracking trajectory, which tracks the second restoration motion data, based on the first restoration motion data and the second restoration motion data.

According to an embodiment, the tracking trajectory may be generated by performing convolution at least once to a restoration function having a distance between a position of the robot indicated by the first restoration motion data and a position of the robot indicated by the second restoration motion data as an area with a rectangular wave function having an area of 1.

According to an embodiment, the data extraction module may extract an original motion data from the input motion trajectory at every predetermined sampling time, and extract the restoration motion data through a reducing process in which a partial data is eliminated from the original motion data.

According to an embodiment, the data extraction module may be configured to compare the original motion data with the previous data to determine data at which the zero-crossing velocity occurs as an anchor point, and transmit motion data corresponding to the anchor point to the data restoration module as the restoration motion data.

According to an embodiment, the original motion data may be compared with previous data to determine data at which the zero-crossing velocity occurs as a candidate anchor point, and when the position of the robot indicated by the two candidate anchor points is spaced apart from the position of the robot indicated by the selected anchor point already confirmed as the restoration motion data to be transmitted over a predetermined distance range, the corresponding candidate anchor point may be determined as a new selected anchor point and transmitted to the data restoration module as restoration motion data corresponding to the selected anchor point.

According to an embodiment, the data extraction module may determine motion data, which are located in the predetermined distance range during a predetermined time, among the original motion data in succession to the determined candidate anchor point as candidate anchor points regardless of the zero-crossing.

According to an embodiment, the data extraction module may be configured to: set a predetermined error range; and compare motion data in succession to the selected anchor point among the original motion data with the selected anchor point, and when a distance variance is beyond the error range, transmit the corresponding motion data as restoration motion data to the data restoration module.

According to an embodiment, the data extraction module may adjust the error range to control a reduction rate of the original motion data.

According to an embodiment, the data extraction module may transmit the selected anchor point as restoration motion data to the data restoration module in a maximum reduction mode.

BRIEF DESCRIPTION OF THE DRAWINGS

FIG. 3 is a flowchart for illustrating a motion data reduction method according to an embodiment of the present disclosure.

DETAILED DESCRIPTION

Figure 1:
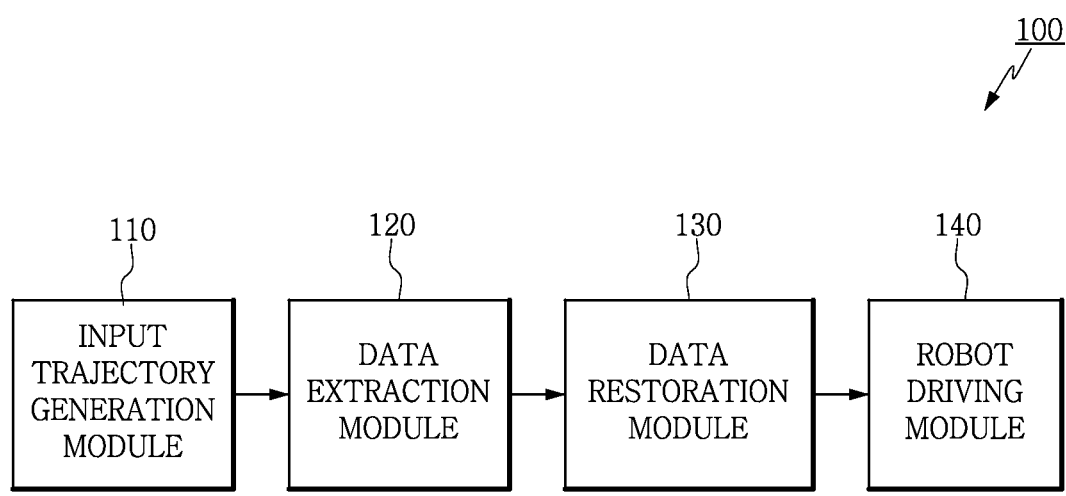
FIG. 1 is a block diagram showing a motion data processing system showing a robot according to an embodiment of the present disclosure.

Hereinafter, embodiments of the present disclosure will be described in detail with reference to the accompanying drawings. Even though the present disclosure is described with reference to an embodiment depicted in the drawings, this is just an example, and the essential configuration and operations of the present disclosure are not limited thereto.

FIG. 1 is a block diagram showing a robot motion data processing system (hereinafter, also referred to as a "data processing system") 100 according to an embodiment of the present disclosure.

Referring to FIG. 1, the data processing system 100 of this embodiment includes a data extraction module 120 for intermittently extracting restoration motion data from a successive input motion trajectory formed for controlling a motion of a robot, and a data restoration module 130 for restoring an output motion trajectory approximate to the input motion trajectory by using restoration motion data extracted from the data extraction module 120.

The data processing system 100 may further include an input trajectory generation module 110 for generating the input motion trajectory, and a robot driving module 140 for driving the robot according to the output motion trajectory generated from the data restoration module 130.

The input trajectory generation module 110 may generate a successive input motion trajectory by collecting successive motion information of a human or a master robot ("master") or generate an input motion trajectory aiming at the motion of the robot by means of a trajectory generating algorithm.

The input trajectory generation module 110 is not always necessary, and a user may directly design a successive input motion trajectory and input the same to the data extraction module 120.

In this specification, the term "successive input motion trajectory" does not always mean a seamless trajectory over the time, but if all data included in the corresponding trajectory are transmitted through a standard network, an aggregate of data may be included in the successive input motion trajectory if the data forming the trajectory have so little time interval not to substantially control the robot in real time.

In this embodiment, the robot motion data in the input motion trajectory may include position data for indicating a position of the robot and velocity data for indicating velocity of the robot at the position.

The data extraction module 120 intermittently extracts restoration motion data from the input motion trajectory and transmits the restoration motion data to the data restoration module 130 through a network.

The network may include either a wireless network or a wired network.

The data restoration module 130 restores an output motion trajectory approximate to the input motion trajectory by using the restoration motion data extracted from the data extraction module 120.

In this embodiment, the output motion trajectory is restored to satisfy a condition that the robot operating according to the corresponding motion trajectory does not exceed a hardware operation limit of the robot.

Here, the "hardware operation limit of the robot" may be, for example, a driving limit such as a maximum velocity, a maximum acceleration, a maximum jerk or the like of the robot, a limit in controlled frequency of the robot, or a limit in size of the robot.

The limit in controlled frequency of the robot and the limit in size of the robot may be relatively easily satisfied. For example, in case of the limit in controlled frequency, restoration is performed only within a limit where the controlled frequency is satisfied, in consideration of time when a reduction signal is received. Regarding the limit in size of the robot, $d_{max}$ (explained later in detail) set during a data reduction process may be received, compared with current $d_{max}$ of the robot and then used as a scaling factor. Meanwhile, when driving limits such as velocity, acceleration, jerk or the like are used, more complicated methods are demanded, as explained later in detail.

The robot driving module 140 drives the robot according to the output motion trajectory generated by the data restoration module 130.

Now, a data processing method of the data extraction module 120 and the data restoration module 130 will be described in detail with reference to the accompanying drawings.

Data Extraction

Figure 2A:
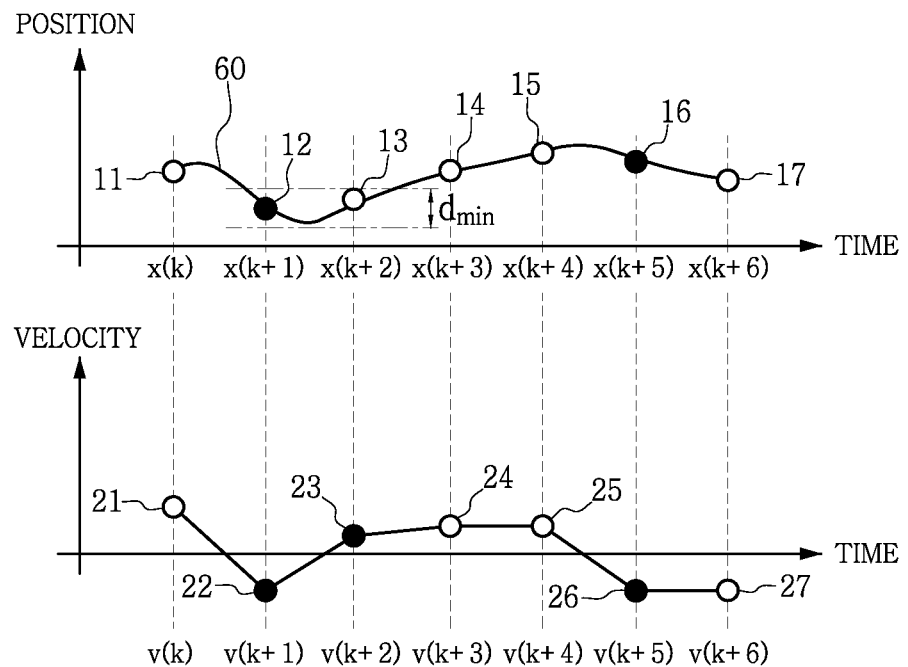
FIGS. 2A and 2B are graphs for illustrating a motion data reduction method according to an embodiment of the present disclosure.
Figure 2B:
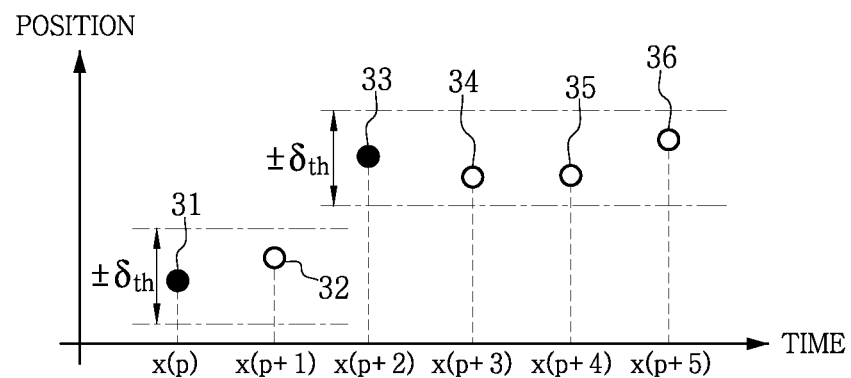

FIGS. 2A and 2B are graphs for illustrating a motion data reduction method by using the data extraction module 120 according to an embodiment of the present disclosure.

As shown in FIG. 2A, the data extraction module 120 extracts original motion data from an input motion trajectory 60 at every predetermined sampling time.

The original motion data includes position data 11 to 17, which represent a position of the robot, and velocity data 21 to 27, which indicate a velocity of the robot.

The data extraction module 120 may adjust a reduction rate according to a state of the network, and in a non-reduction mode where the reduction rate is 0, all of the original motion data may be transmitted to the data restoration module 130 as restoration motion data.

However, in order to decrease the amount and frequency of data transmission, the data extraction module 120 of this embodiment performs a reduction process by eliminating a part of the original motion data. In this embodiment, the restoration motion data is a reduced data obtained by reducing the original motion data.

In this embodiment, for the data reduction, a method for finding an anchor point representing minimal samples to maintain a signal characteristic of motion data and/or a so-called "dead band" method for selecting an error range to filter the data is used.

First, the method for finding an anchor point will be described. In this embodiment, the position data 11 to 17 of the original motion data are compared with previous data, and data at which the zero-crossing velocity occurs is determined as an anchor point.

In more detail, in a digital signal system, the motion data is discrete data, and thus it is substantially impossible to accurate a point with zero velocity all the time. Therefore, in this embodiment, the anchor point is defined as follows.

First, if the equation $v(k) \cdot v(k-1) \leq 0$ is satisfied, since a point where a current velocity of the data is 0 is passed, the data at that time is assumed as a signal where velocity is 0, and this is determined as a candidate anchor point which is to be determined as the anchor point. In this method, it is possible to estimate a direction change or stop of the robot.

Referring to FIG. 2A, the position data 12, the position data 13 and the position data 16 are data corresponding to the candidate anchor point.

The candidate anchor point determined at this stage may be determined as an anchor point as it is, and the position data 12, the position data 13 and the position data 16 may be transmitted as restoration motion data to the data restoration module 130.

However, in this embodiment, even though the actual velocity is 0, a time condition for confirming the anchor point is added in order to consider a situation where a change of the velocity value is insignificant due to a numerical error or a small velocity value.

After the candidate anchor point is determined as above, if the signal value of the corresponding point stays within a given range ($d_{min}$) during a predetermined time, successive motion data during the time are also set as candidate anchor points regardless of zero-crossing. This is to consider a situation where a change of the velocity value is maintained in a slight level due to a numerical error or a small velocity value in spite of zero velocity. At this time, the equation $t_d = \zeta / T_s$ may be referred to, where $0 \leq \zeta \leq 1$, and $T_s$ represents a sampling time at which one signal is received. For example, $1/T_s$ may be the number of data generated during 1 second. Therefore, if a new signal stays within a given range during $t_d$ time, all signals after that time are set as candidate anchor points. Meanwhile, a user may adjust the value $\zeta$ to determine the time after which signals are set as candidate anchor points. By doing so, a point where a stop state changes into an operating state may be estimated.

Subsequently, if the candidate anchor point obtained as above is spaced apart from the selected anchor point signal already confirmed as an anchor point over a predetermined distance, this is determined as a new selected anchor point. At this time, the equation $y_{t+1} = y_a$, if $|y_a - y_t| \geq d_{min}$ may be referred to, which is for applying a threshold value to eliminate neighboring points, and $d_{min}$ may be defined by the user. In this method, states where operation and stop are repeated due to signal noise or very small motion may be filtered off, thereby eliminating unnecessary signals.

For example, in FIG. 2A, the position data 12, 16 may become respectively data corresponding to the selected anchor point. The position data 12, 16 corresponding to the selected anchor point are transmitted as restoration motion data to the data restoration module 130.

Hereinafter, a method for reducing original motion data by means of a dead band will be described.

In the reduction method using an anchor point described above, minimal samples are found to maintain a characteristic of an operation signal. However, in the reduction method using a dead band, signals are transmitted only when other signals are beyond the threshold value.

Referring to FIG. 2B, a method for selecting restoration motion data by reducing original motion data at p, p+1, p+3, p+4, and p+5 time by means of a dead band is schematically illustrated.

For generalized explanation, FIG. 2B uses a label different from FIG. 2A (in other words, p is used instead of k).

If a motion data 31 to be transmitted as restoration motion data is confirmed, it is determined based on the motion data 31 whether a distance variance of successive motion data 32 with respect to the motion data 31 is within a predetermined error range ($\pm \delta_{th}$). Since the motion data 32 is within the error range ($\pm \delta_{th}$), the motion data 32 is not included in the restoration motion data.

The above determination is repeated to successive motion data, and if a motion data 33 having a distance variance with respect to the motion data 31 beyond the error range ($\pm \delta_{th}$) appears, the corresponding motion data is included in the restoration motion data.

After that, based on the motion data 33 which is a new restoration motion data, it is determined whether successive data are within the error range ($\pm \delta_{th}$).

In this embodiment, the error range is defined according to Equation 1.

$$\delta = \gamma d_{max} \qquad \text{Equation 1}$$

Here, $\delta$ represents a threshold value which defines the error range, $\gamma$ is a value between 0 and 1 which is defined by the user, and $d_{max}$ represents a maximum length of the robot.

Meanwhile, if γ is 0, this means that the restoration motion data is identical to the original motion data, and in this case, reduction is not performed at all. Meanwhile, if γ is 1, this means maximum reduction.

In this method, while maintaining basic characteristics of an operation signal by using the anchor point, it is possible to automatically or manually select a reduction rate between maximum reduction and non-reduction by adjusting the γ value. In an embodiment, in order to adjust the range of γ value, the user may set $d_{max}$ which represents a maximum value of the signal. $d_{max}$ may be determined as a specific hardware value such as a maximum length of the arm of the robot. As described above, a maximum difference between the original signal and the reduced signal, namely a maximum error, may be controlled by adjusting the reduction rate, and thus when setting the reduction rate, the user may estimate the degree of error of the reduced signal in advance.

In this method, the present disclosure allows normalization by $d_{max}$, and thus consistent reduction is ensured regardless of the signal size.

In this embodiment, in order to enhance the reduction efficiency, the anchor point method and the dead band method may be alternately applied to reduce original motion data.

FIG. 3 is a flowchart for illustrating an original motion data reduction method according to an embodiment of the present disclosure Referring to FIG. 3, the motion data reduction method may embrace from S110 for obtaining original motion data to S150 for transmitting reduced data.

In S110, the data extraction module 120 obtains original motion data by means of a sensor or another interface device.

In S120, the data extraction module 120 extracts a selected anchor point from the obtained original motion data.

In S130, the data extraction module 120 performs reduction by using a dead band. In detail, the data extraction module 120 determines whether the compression parameter (γ) is 1. If the compression parameter is 1, a maximum reduction rate is applied, and motion data corresponding to the selected anchor point extracted in the above step is transmitted as restoration motion data to the data restoration module 130 (the process proceeds to S150).

Meanwhile, if the compression parameter is not 1, the process proceeds to S140 to additionally extract restoration motion data.

In S140, the data extraction module 120 additionally extract data other than the selected anchor point from the original motion data, based on an error range ($\pm\delta_{th}$) determined according to a compression parameter.

In detail, the data extraction module 120 determines whether a distance variance of successive data is within the error range, based on a recent selected anchor point. Points indicated by the successive motion data do not have great variances from the selected anchor point and are likely not to give an importance influence on the control of the robot, and thus they are excluded when selecting the restoration motion data. Meanwhile, if variances of the points are beyond the threshold value based on the selected anchor point, these points have great variances from the selected anchor point and are highly likely to give an important influence on the control of the robot. Therefore, motion data representing these points are extracted as restoration motion data.

In S150, the data extraction module 120 transmits the motion data corresponding to the selected anchor point and the motion data newly extracted by the dead band method to the data restoration module 130 as restoration motion data.

According to the motion data reduction method as above, it is possible to extract and transmit just far fewer data as reduced data, in comparison to the data reducing method based on human perception proposed in the non-patent literature 1.

Data Restoration

The restoration motion data reduced from the original motion data by the data extraction module 120 are data obtained by omitting many intermediate data from the original motion data in order to reduce data amount to be transmitted and transmission frequency. Therefore, it is actually not easy to control the robot by using only the received restoration motion data, and the intermediate data are interpolated based on the restoration motion data to generate an output motion trajectory approximate to the input motion trajectory in order to control operations of the actual robot.

For example, according to a sampling period of the original motion data, a plurality of interpolation data may be inserted among the received reduced data by means of a zero-order-hold method or a linear prediction method to perform restoration.

In this case, the interpolated intermediate data are not data directly received from the data extraction module 120 but data interpolated by means of prediction, which may have an error in comparison to the actual original motion data. Such error may be accumulated as time goes, and when a new restoration motion data is received afterwards, an interval between the previously interpolated data and a new restoration motion data may be seriously great due to the accumulated error. In this case, if the motion data of the robot is controlled to rapidly track the new restoration motion data, a motion according to the control may exceed a physical limit of the robot, which may damage the robot. Therefore, in the present disclosure, in this case, the motion data is restored by using a restoration method which considers hardware limits of the robot between a restoration motion data and data on the output motion trajectory already restored.

In detail, the data restoration module 130 of this embodiment interpolates the restoration motion data to generate an output motion trajectory while satisfying the condition that the restored signal does not exceed physical limits of the robot, for example hardware operation limit of the robot such as velocity, acceleration, jerk or the like.

This restoration method may use a polynomial. However, a method using a polynomial demands an optimization process in order to consider hardware limits of the robot, which may consume a lot of time in data restoration. Therefore, the method using a polynomial may be more advantageous in a system having a high-performance processor.

In order to ensure easy restoration in a system with low performance, in this embodiment, a restoration method using convolution is used.

Figure 4:
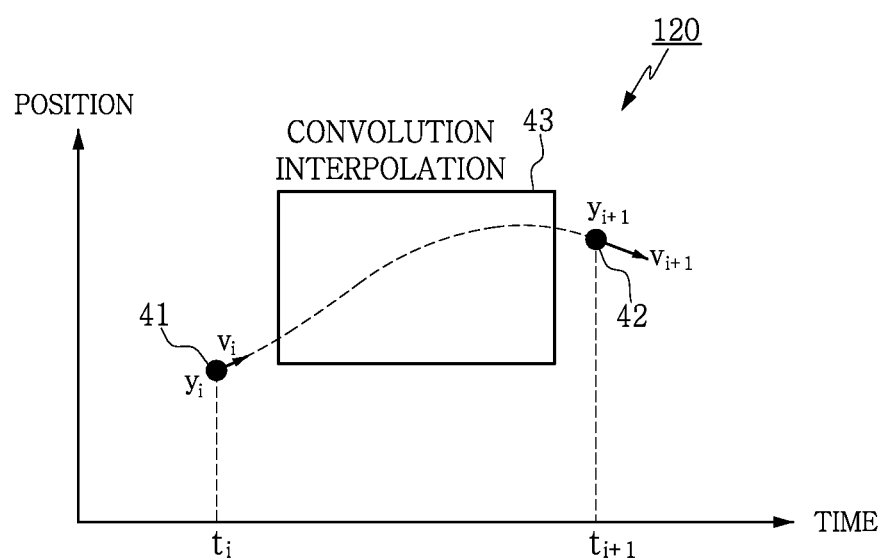
FIG. 4 is a graph showing a summary of a data restoration/generation method according to an embodiment of the present disclosure.

FIG. 4 is a graph for illustrating the concept of the data restoration method according to an embodiment of the present disclosure.

First, it is assumed that first data ($y_i$) indicated by a reference number 41 is a currently restored position data and second data ($y_{i+1}$) indicated by a reference number 42 is a restoration motion data which is a newly received position data. However, this is just an example, and the first data ($y_i$) and the second data ($y_{i+1}$) may be respectively a current velocity data and a newly received velocity data. During a motion data restoring process, the data restoration module 130 generates an output motion trajectory to move the robot from a current position ($y_i$) to a new position ($y_{i+1}$), and convolution-interpolated data may be inserted among position data ($y_i$, $y_{i+1}$) so that the generated output motion trajectory does not exceed a maximum velocity, a maximum acceleration and a maximum jerk of the robot.

In other words, since the robot is not able to move directly from the current position ($y_i$) to the new position ($y_{i+1}$) due to the limits of a maximum velocity, a maximum acceleration and a maximum jerk, the data restoration module 130 generates an output motion trajectory 43, which the robot may actually track, by means of convolution interpolation.

The convolution interpolation method and a motion trajectory generated by the method will be described in more detail later with reference to FIGS. 5A to 5C.

Figure 5A:
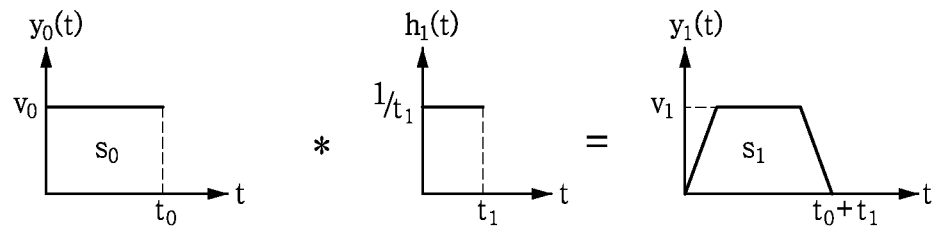
FIGS. 5A to 5C and 6 are diagrams for illustrating a convolution interpolation method used for data restoration/generation according to an embodiment of the present disclosure.
Figure 5B:
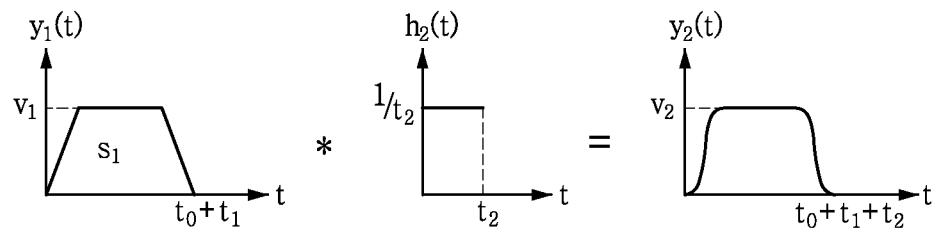
Figure 5C:
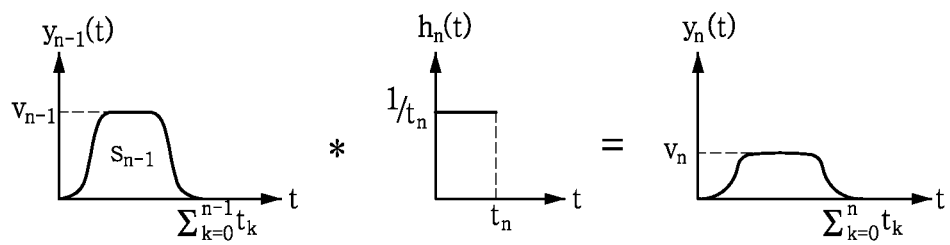

FIGS. 5A to 5C are diagrams for illustrating a convolution interpolation method used for motion trajectory restoration/generation according to an embodiment of the present disclosure.

The convolution interpolation method may advantageously generate differentiable trajectories successively without departing from physical limits of the robot. This convolution interpolation method may be performed by repeatedly applying convolution several times.

FIG. 5A is a diagram for illustrating a first convolution of the convolution interpolation method according to this embodiment. In FIG. 5A, an initial velocity and an initial position are respectively assumed to be 0.

If the input restoration motion data designates that the robot has a position of $S_o$ and a velocity at that time is designated as $v_o$, the output motion trajectory of the robot is generated as a trajectory $y_0(t)$. At this time, the trajectory $y_0(t)$ is continuous but not differentiable, and thus if actual hardware conditions of the robot are taken into consideration, the robot is not able to track the original trajectory $y_0(t)$ as it is.

Therefore, by means of the first convolution, the original trajectory $y_0(t)$ is converted into a first trajectory $y_1(t)$. As shown in FIG. 5A, the original trajectory $y_1(t)$ is generated more softly in comparison to the first trajectory $y_0(t)$. This is because physical limits of the robot are reflected. At this time, the used convolution function is a convolution function $h_1(t)$ which is a rectangular wave function of a unit area.

Generally, the convolution is defined as Equation 2 below.

$$y(t) = \int_{-\infty}^{\infty} h(\tau)x(t-x)d\tau = \qquad \text{Equation 2}$$

$$\frac{1}{t_h}\int_0^{t_h} x(t-\tau)d\tau = \begin{cases} \frac{1}{t_h}\int_0^{t_h} x(t-\tau)dx, & 0 \le t \le t_x + t_h \\ 0, & \text{otherwise} \end{cases}$$

Trajectories generated through convolution (for example, the first trajectory $y_1(t)$) have the following attributes.

1) Even though the first trajectory $y_1(t)$ is gentler than the original trajectory $y_0(t)$, the first trajectory $y_1(t)$ has a duration ($t_o+t_1$) as much as the sum of durations of the original trajectory $y_0(t)$ and the convolution function $h_1(t)$.

2) The first trajectory $y_1(t)$ has the same area as the original trajectory $y_0(t)$ ($S_0=S_1$).

3) The maximum size of the first trajectory $y_1(t)$ is equal to or smaller than the maximum size of the original trajectory $y_0(t)$ ($v_0 \ge v_1$).

Meanwhile, the convolution process may be repeatedly performed to generate a longer trajectory having a gentler duration.

In FIG. 5B, a secondary convolution is performed to the trajectory $y_1(t)$ obtained through the first convolution to generate a secondary trajectory $y_2(t)$. The generated trajectory $y_2(t)$ is gentler than the first trajectory $y_1(t)$ but has a duration ($t_o+t_1+t_2$) as much as the sum of the duration of the first trajectory $y_1(t)$ and the duration of the secondary convolution function $h_2(t)$. Meanwhile, similar to the case of the first trajectory $y_1(t)$ above, the secondary trajectory $y_2(t)$ also has the same area as the first trajectory $y_1(t)$ ($S_0=S_1=S_2$), and the maximum size of the secondary trajectory $y_2(t)$ is equal to or smaller than the maximum size of the first trajectory $y_1(t)$ ($v_0 \ge v_1 \ge v_2$).

Such a form where discrete representations of convolution are repeated may be expressed as Equation 3 below.

$$y_n[k] = \frac{y_{n-1}[k] - y_{n-1}[k-m_n]}{m_n} + y_n[k-1], \qquad \text{Equation 3}$$

However, $k=[t/T_s]$, $m_n=[t_n/T_s]$, where $T_s$ represents a sampling period, and $[x]$ means a gauss floor function.

By using the above method, a gentler trajectory may be generated by repeating convolution (see FIG. 5C). The repetition frequency of convolution is not limited, and if it is impossible or inadequate for the robot to track a trajectory generated through convolution without change, the convolution may be suitably repeated to solve this problem. In other case, the user may determine the repetition frequency of convolution in advance, and the convolution is repeatedly performed as much as the predetermined frequency. As described above, if the frequency of convolution increases, a generated trajectory becomes gentler, and the possibility of deviating physical limits of the robot decreases. However, in this case, the time of reaching a final control position is delayed more.

Meanwhile, the data restoration module 130 of this embodiment sets a parameter of the convolution function, used in the convolution process, in consideration of physical limits of the robot. In detail, referring to FIGS. 5A to 5C, a duration ($t_k$) in a $k^{th}$ convolution function at a $k^{th}$ convolution is defined as in Equation 4 below.

$$t_k = \frac{v_{max}^{k-1}}{v_{max}^k} \text{ for } k = 1, 2, \ldots, n \qquad \text{Equation 4}$$

Here, $v_{max}^k$ means a system limit of the robot with regard to the $k^{th}$ convolution. For example, $v_{max}^0$, $v_{max}^1$, $v_{max}^2$ respectively represent a maximum velocity, a maximum acceleration and a maximum jerk of the robot.

According to the motion data restoration method based on convolution as described above, the motion data may be restored by reflecting physical limits of maximum velocity, acceleration and jerk of a driving unit which drives the robot. A maximum error, namely a maximum error, between the signal restored according to the method described above and the original signal is similar to that set during a reducing process. The maximum error is not identical since a signal is not able to be restored identical to the original signal due to a numerical error or the nature of the interpolation method during the restoring process. However, since the numerical error or the error caused by interpolation is limited within a predetermined range, the maximum error of the restored signal does not greatly deviate from the maximum error set during the reducing process but has a similar range thereto.

Meanwhile, in the convolution method described above, time is discrete, and thus if the time is smaller than the sampling period ($T_s$), the time is set to be 0. In other words, a distance error (e) smaller than a value obtained by multiplying the sampling period ($T_s$) by the initial velocity ($v_0$) is not processed by the convolution method (a resolution error). The maximum resolution error ($e_{max}$) is generated when the initial velocity is the maximum velocity of the robot, and this resolution error may be solved by forcibly setting the initial time ($t_0$) to be identical to the sampling period ($T_s$) and calculating the initial velocity ($v_0$) according to a linear prediction method.

Figure 6:
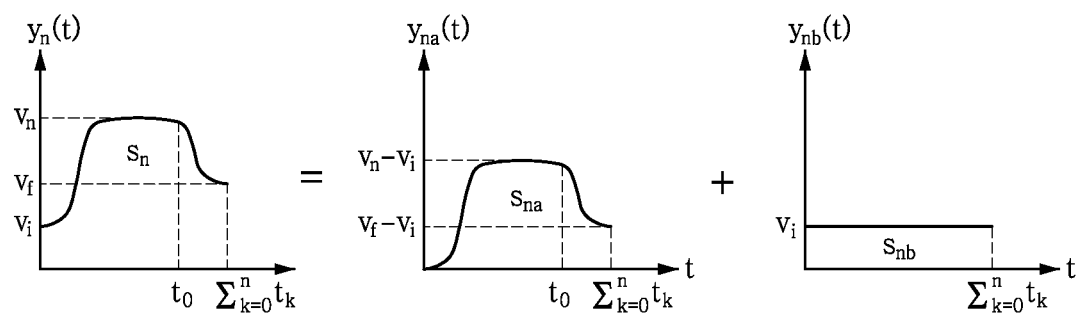

FIG. 6 is a diagram for illustrating the convolution interpolation method when the initial velocity is not 0. In FIG. 6, the initial velocity of the original trajectory is $v_i$, and the final velocity is $v_f$ (but, $v_i \neq 0$, $v_f \neq 0$).

In this case, the restoration function is divided into a portion ($y_{na}(t)$) where the initial velocity is 0 and a rectangular wave function portion ($y_{nb}(t)$) where the initial velocity is not 0. In addition, the convolution is applied to each portion in the same way as illustrated in FIG. 5, and then its result is added thereto to obtain an overall convolution result.

This convolution process may be expressed like Equation 5 below.

$$S_n = S_{na} + S_{nb} = \left( (v_0 - v_i)t_0 + \frac{v_f - v_i}{2} \sum_{k=1}^{n} t_k \right) + v_i \sum_{k=0}^{n} t_k = \quad \text{Equation 5}$$

$$v_0 t_0 + \frac{v_f + v_i}{2} \sum_{k=1}^{n} t_k$$

In this embodiment, the output motion trajectory is restored from the restoration motion data by using the convolution method described above.

Figure 7:
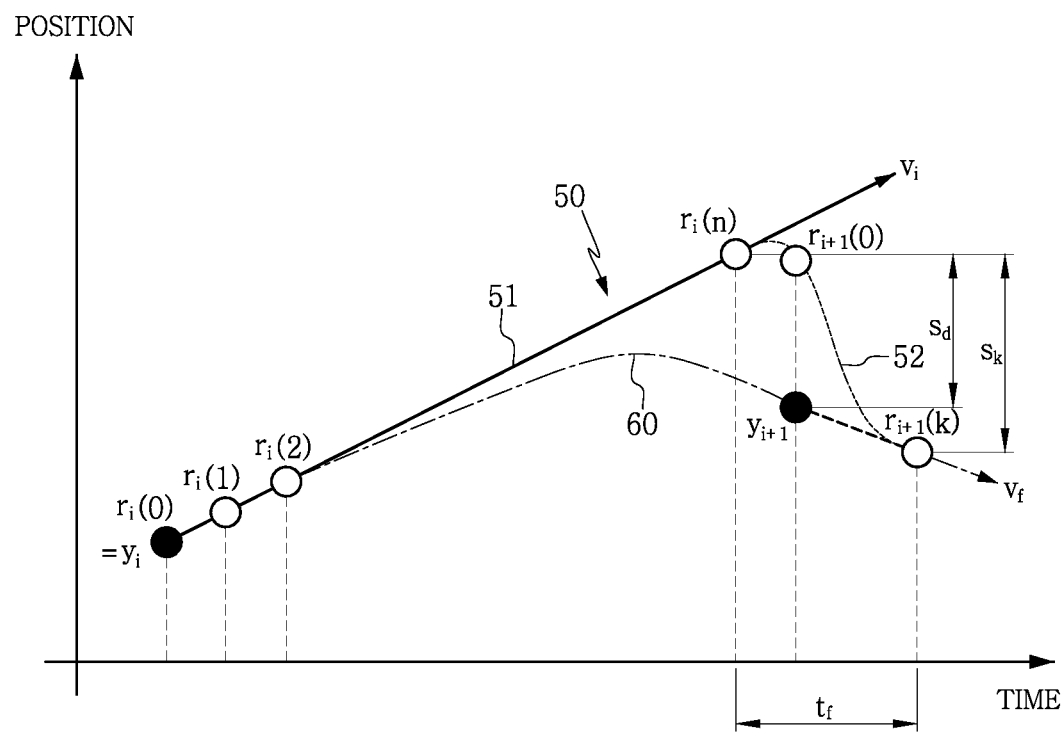
FIG. 7 is a graph for illustrating a high-speed data restoration/generation method according to an embodiment of the present disclosure.

FIG. 7 is a graph for illustrating a high-speed data restoration/generation method in which a real-time characteristic is emphasized, according to an embodiment of the present disclosure.

Referring to FIG. 7, for real-time high-speed data restoration, if receiving the first restoration motion data ($y_i$) from the data extraction module 120, the data restoration module 130 generates an estimated trajectory 51 by interpolating the trajectory by using a general restoration method such as a zero-order-hold method or a linear prediction method, based on the first restoration motion data, and then if successive second restoration motion data ($y_{i+1}$) is received, the data restoration module 130 performs convolution interpolation based on the current motion data ($r_i(n)$) of the robot indicated by the estimated trajectory 51 and the second restoration motion data, thereby generating a tracking trajectory 52 which tracks the second restoration motion data.

Accordingly, an output motion trajectory 50 connecting from the estimated trajectory 51 to the tracking trajectory 52 is generated in real time.

For example, it is assumed that the first restoration motion data is received and the target position and the target velocity of the robot at that time are respectively $y_i$, $v_i$. At this time, the data restoration module 130 restores the motion data of the robot at every predetermined sampling period by using any one of general restoration methods. For example, if the motion data of the robot is restored by means of the linear prediction method, the restored motion data will have a position of $y_i$ at t=0 and become a trajectory which proceeds with a velocity of $v_i$.

At this time, the velocity ($v_i$) may be set to be 0 and be any velocity smaller than the available maximum velocity of the robot, or be velocity data of the robot included in the first restoration motion data.

The data restoration module 130 generates the output motion trajectory in a way of generating trajectory data ($r_i(1), r_i(2), \ldots, r_i(n)$) at every constant restoring sampling time ($T_s$) until a new restoration motion data is received. At this time, the interpolated motion data ($r_i(1), r_i(2), \ldots, r_i(n)$) are estimated values, which may have an error from the actual original motion data 60.

If the second restoration motion data is received, a target position ($y_{i+1}$) (and, a target velocity ($v_f$)) included in the data is detected, and convolution is performed based on the estimated previous restoration data ($r_i(n)$) and the second restoration motion data so that the robot may track the target position ($y_{i+1}$) and the target velocity ($v_f$) without exceeding the physical limit.

The restoration data ($r_i(n)$) includes a position of the robot indicated by the estimated trajectory 51 and is estimated in a restoration sampling period just before the second restoration motion data is input.

In detail, a distance ($S_d$) between the position of the robot indicated by the restoration data ($r_i(n)$) and the position (yi+1) of the robot indicated by the second restoration motion data is used as an area of the original restoration function (for example, $S_0$ of $y_0(t)$ in FIG. 5), the original restoration function having an initial velocity of $v_i$ and a final velocity of $v_f$ is set, and then convolution is performed thereto according to the method illustrated in FIG. 5 or FIG. 6 at least once to generate a tracking trajectory 52.

If convolution is performed at least three times to generate the tracking trajectory 52, the robot may move to the position indicated by the second restoration motion data within a range where the tracking trajectory does not exceed the maximum velocity, the maximum acceleration and the maximum jerk of the robot.

However, if the final velocity ($v_f$) of the robot is not 0 at the point when the second restoration motion data is input, the robot further moves with the velocity ($v_f$) while the original motion data is being tracked according to the convolution (in FIG. 7, moves further as much as $y_{i+1} - r_{i+1}(k)$).

In order to compensate such an additional movement, in this embodiment, the tracking trajectory 52 is generated to track an estimated motion data ($r_{i+1}(k)$), which estimates a motion of the robot after a predetermined time from the point when the second restoration motion data is received, based on the second restoration motion data.

Since the position ($y_{i+1}$) and the velocity ($v_f$) of the robot at the point when the second restoration motion data is received are already known, the information of the estimated motion data ($r_{i+1}(k)$), which indicates the position of the robot after a predetermined time ($t_f$) from a sampling time when the restoration data ($r_i(n)$) is generated, may be predicted.

In detail, convolution is performed to a restoration function having a distance ($S_k$) between a position of the robot at the restoration data ($r_i(n)$) and a position of the robot indicated by the estimated motion data ($r_{i+1}(k)$) as an area, instead of the distance ($S_d$) between the position of the robot at the restoration data ($r_i(n)$) and the position ($y_{i+1}$) of the robot indicated by the second restoration motion data, at least once to generate a tracking trajectory.

At this time, the area ($S_k$) of the restoration function may be calculated by Equation 6 below.

$$S_k = S_d + v_f t_f = w_{max}^0 t_0 + \frac{(v_f + v_i)}{2}\sum_{i=1}^{n} t_i \qquad \text{Equation 6}$$

Here, $w^o{}_{max}$ represents an available maximum velocity of the robot, and time ($t_o$) for performing convolution once may be calculated by Equation 7 below.

$$t_0 = \frac{S_d - \frac{(v_i - v_f)}{2}\sum_{i=1}^{n} t_i}{w_{max}^0 - v_f} \qquad \text{Equation 7}$$

Meanwhile, the velocity ($v_f$) of the robot indicated by the second restoration motion data extracted from the original motion data may exceed the available maximum velocity ($w^o{}_{max}$) of the robot.

In this case, even though the robot is operated up to the maximum operation limit, the estimated motion data ($r_{i+1}(k)$) may not be tracked, and in this case, the tracking trajectory 52 is generated to track the second restoration motion data with the maximum operation limit of the robot after a predetermined time delay.

In other words, convolution is performed to a restoration function having a distance ($S_d$) between a position of the robot indicated by the restoration data ($r_i(n)$) at the end point of the estimated trajectory and a position of the robot indicated by the estimated motion data ($r_{i+1}(k)$) at least once to generate a tracking trajectory.

At this time, the area ($S_d$) of the restoration function may be calculated by Equation 8 below.

$$S_d = w_{max}^0 t_0 + \frac{w_{max}^0 + v_i}{2}\sum_{i=1}^{n} t_i \qquad \text{Equation 8}$$

Here, $w^o{}_{max}$ represents an available maximum velocity of the robot, and time ($t_o$) for performing convolution once may be calculated by Equation 9 below.

$$t_0 = \left(S_d - \frac{w_{max}^0 + v_i}{2}\sum_{i=1}^{n} t_i\right) \bigg/ w_{max}^0 \qquad \text{Equation 9}$$

In this embodiment, even though there may be a little time delay in tracking the second restoration motion data, the tracking trajectory may be generated without exceeding the maximum operation limit of the robot.

Heretofore, an embodiment for high-speed data restoration in which a real-time characteristic is emphasized has been described. In this embodiment, even though an error is generated between the estimated trajectory 51 restored in an estimated range and the input motion trajectory 60, if a new restoration motion data is received, the motion data of the robot is instantly corrected to track the original motion data, so as not to deviate physical limits of the robot.

In addition, since motion data is instantly estimated and generated whenever restoration motion data is received, an output motion trajectory may be restored and generated very rapidly to control the robot.

Figure 8:
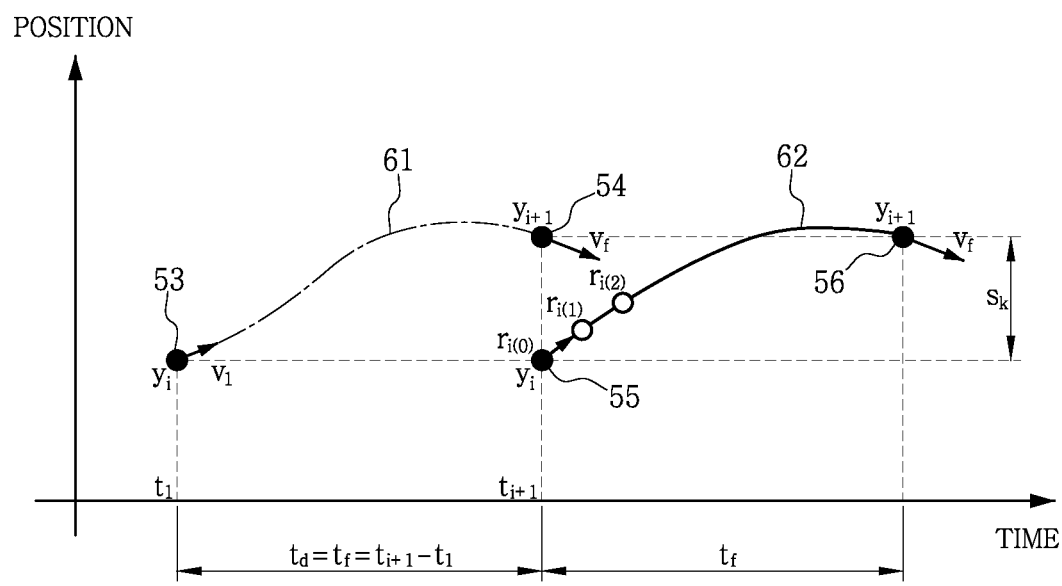
FIG. 8 is a graph for illustrating a precise data restoration/generation method according to another embodiment of the present disclosure.

Meanwhile, FIG. 8 is a graph for illustrating a precise data restoration method, in which error minimization and accuracy are emphasized, according to another embodiment of the present disclosure.

In FIG. 8, a restoration method for minimizing an error of an original motion data even though a trajectory has a somewhat slow restoration velocity will be described.

In the method of FIG. 8, the restoration module 120 performs restoration based on convolution after waiting until at least two restoration motion data are received.

For example, it is assumed that a first restoration motion data is received at a time $t_i$ and a second restoration motion data is received at a time $t_{i+1}$. In this case, the data restoration module 130 does not perform restoration in a time region between $t_i$ and $t_{i+1}$, and generates a tracking trajectory 62 at the $t_{i+1}$ time when at least two restoration motion data are completely received.

In this embodiment, an estimated trajectory is not present, and the tracking trajectory 62 serves as an output motion trajectory. The trajectory designated by the reference number 61 is an input motion trajectory.

At this time, in order to track the trajectory 61 of the original motion data, the tracking trajectory 62 connecting from the first restoration motion data ($y_i$, $v_i$) to the second restoration motion data ($y_{i+1}$, $v_f$) is generated, the restoration is performed based on convolution so that the robot does not exceed its hardware physical limits even though the robot operates according to the generated tracking trajectory 62.

In FIG. 8, a distance ($S_k$) between a position ($y_i$) of the robot indicated by the restoration motion data 53 and a position ($y_{i+1}$) of the robot indicated by the second restoration motion data 54 is used as an area of the restoration function (for example, $S_0$ of $y_0(t)$ in FIG. 5), and the tracking trajectory 62 is generated by performing convolution according to the methods as described above by setting the restoration function having an initial velocity of $v_i$ and a final velocity of $v_f$.

According to the restoration method illustrated in FIG. 8, since the trajectory restoration is initiated after the second restoration motion data are received, the method is executed slowly in comparison to the high-speed restoration method of FIG. 7. However, if the time ($t_f$) at which two restoration motion data are received is sufficiently short or a network is not good, the original motion data does not have a great error in comparison to the extracted input motion trajectory 61 since the trajectory is restored based on two definitive restoration motion data.

Figure 9A:
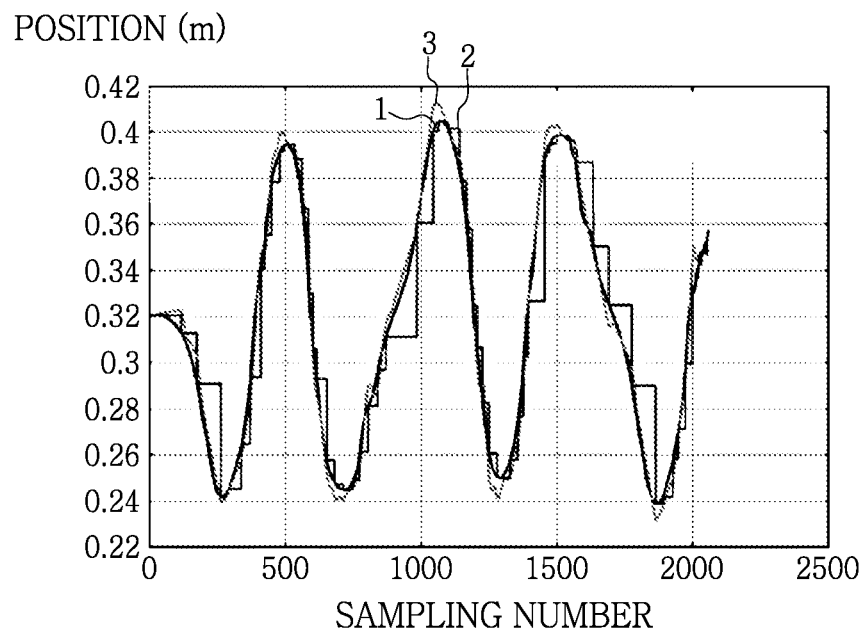
FIGS. 9A and 9B are graphs showing simulation results of a reduction/restoration system according to embodiments of the present disclosure.
Figure 9B:
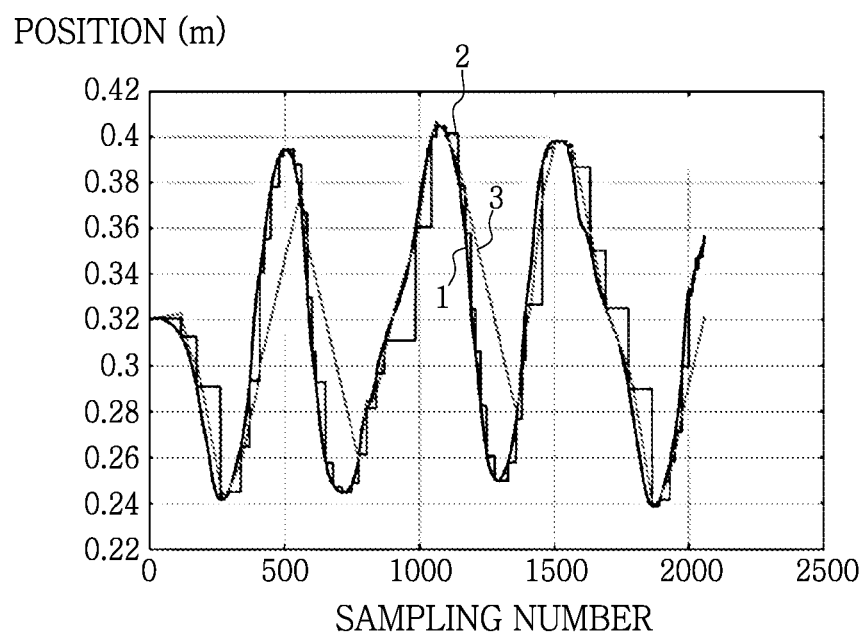

FIGS. 9A and 9B are graphs showing simulation results of a motion data processing system according to embodiments of the present disclosure.

FIG. 9A shows a simulation result when the robot has relatively good hardware performance, and FIG. 9B shows a simulation result when the robot has relatively bad hardware performance.

In FIGS. 9A and 9B, a first graph 1 depicts an input motion trajectory, a second graph 2 depicts a restoration motion data reduced and transmitted according to the data reduction method of this embodiment, and a third graph 3 depicts an output motion trajectory restored according to this embodiment.

If the robot has good hardware performance, available velocity, acceleration and jerk limits of the robot are higher, and thus the trajectory-tracing velocity exhibits relatively more excellent tracking performance. Meanwhile, if the robot has bad hardware performance, available velocity, acceleration and jerk limits of the robot are lower, and thus a greater error occurs between the restored trajectory and the original trajectory.

However, regardless of the hardware performance, an output motion trajectory 3 is restored in consideration of physical hardware limits of the robot, and thus it may be found that stability is ensured in aspect of control.

In the motion data processing system of this embodiment, since reduced data is automatically restored compatible to the performance of the robot, the data may be used regardless of the hardware performance of the robot. In addition, stable control is ensured since data continuity is ensured up to a level designated by a user, and an error from the original data may be predicted during a reducing or restoring process, thereby ensuring precise control.

What is claimed is:

1. A robot motion data processing apparatus, comprising:
a data extractor configured to intermittently extract restoration motion data from an input motion trajectory of a robot; and
a data restorer configured to generate an output motion trajectory corresponding to the input motion trajectory based on a hardware operation limit of the robot and the restoration motion data,
wherein the output motion trajectory does not exceed the hardware operation limit of the robot,
wherein the data restorer is further configured to:
generate an estimated trajectory estimated based on a received first restoration motion data; and
generate a tracking trajectory of a second restoration motion data based on the second restoration motion data and a current robot motion data indicated by an end point of the estimated trajectory to generate the output motion trajectory in real time, in response to the second restoration motion data being received,
wherein the tracking trajectory is generated to track estimated motion data, and
wherein the estimated motion data is an estimate of a motion of the robot after a time from a point when the second restoration motion data is received based on the second restoration motion data.

2. The robot motion data processing apparatus according to claim 1,
wherein the tracking trajectory is generated to trace the second restoration motion data with a time delay within the maximum operation limit of the robot, in response to a determination that the robot does not trace the estimated motion data and the robot is operated up to a maximum operation limit.

3. The robot motion data processing apparatus according to claim 1,
wherein the tracking trajectory is generated by performing convolution to a restoration function having a distance between a position of the robot indicated by the end point of the estimated trajectory and a position of the robot indicated by the second restoration motion data as an area with a rectangular wave function having an area of 1 under a rectangle of the rectangular wave function.

4. The robot motion data processing apparatus according to claim 1,
wherein the tracking trajectory is generated by performing convolution to a restoration function having a distance between a position of the robot indicated by the end point of the estimated trajectory and a position of the robot indicated by the estimated motion data as an area with a rectangular wave function having an area of 1 under a rectangle of the rectangular wave function.

5. The robot motion data processing apparatus according to claim 1,
wherein the data restorer is further configured to generate a tracking trajectory that tracks the second restoration motion data based on the first restoration motion data and the second restoration motion data, in response to receiving a first restoration motion data and receiving a second restoration motion data.

6. The robot motion data processing apparatus according to claim 5,
wherein the tracking trajectory is generated by performing convolution to a restoration function having a distance between a position of the robot indicated by the first restoration motion data and a position of the robot indicated by the second restoration motion data as an area with a rectangular wave function having an area of 1 under a rectangle of the rectangular wave function.

7. A robot motion data processing apparatus, comprising:
a data extractor configured to intermittently extract restoration motion data from an input motion trajectory of a robot; and
a data restorer configured to generate an output motion trajectory corresponding to the input motion trajectory based on the restoration motion data,
wherein the data extractor is further configured to:
extract an original motion data from the input motion trajectory at a sampling time, and to extract the restoration motion data through a reducing process in which a partial data is eliminated from the original motion data,
compare the original motion data with previous data to determine data at which the zero-crossing velocity occurs as an anchor point, and
transmit motion data corresponding to the anchor point to the data restorer as the restoration motion data.

8. The robot motion data processing apparatus according to claim 7,
wherein the original motion data is compared with previous data to determine data at which the zero-crossing velocity occurs as a candidate anchor point, and
wherein the corresponding candidate anchor point is determined as a new selected anchor point and transmitted to the data restorer as restoration motion data corresponding to the selected anchor point, in response to the position of the robot indicated by the two candidate anchor points being spaced apart from the position of the robot indicated by the selected anchor point confirmed as the restoration motion data to be transmitted over a distance range.

9. The robot motion data processing apparatus according to claim 8,
wherein the data extractor is further configured to determine motion data located in the distance range during a time among the original motion data in succession to the determined candidate anchor point as candidate anchor points.

10. The robot motion data processing apparatus according to claim 9, wherein the data extractor is configured to:
set an error range; and
compare motion data in succession to the selected anchor point among the original motion data with the selected anchor point, and transmit the corresponding motion data as restoration motion data to the data restorer, in response to a distance variance being beyond the error range.

11. The robot motion data processing apparatus according to claim 10, wherein the data extractor is further configured to adjust the error range to control a reduction rate of the original motion data.

12. The robot motion data processing apparatus according to claim 11,
wherein the data extractor is further configured to transmit the selected anchor point as restoration motion data to the data restorer in a maximum reduction mode.

13. A robot motion data processing apparatus according to claim 7, wherein the data restorer is configured to generate the output motion trajectory corresponding to the input motion trajectory based on a hardware operation limit of the robot and the restoration motion data, and wherein the output motion trajectory does not exceed the hardware operation limit of the robot.

* * * * *